March 24, 1959 — O. ANDERSON — 2,878,613
COMBINATION BAIT HOLDER, LURE AND FISH HOOK
Filed Jan. 14, 1957

Inventor
Oscar Anderson
by Parker & Carter
Attorneys

United States Patent Office 2,878,613
Patented Mar. 24, 1959

2,878,613

COMBINATION BAIT HOLDER, LURE AND FISH HOOK

Oscar Anderson, Chicago, Ill.

Application January 14, 1957, Serial No. 633,969

10 Claims. (Cl. 43—44.2)

My invention relates to improvements in combination bait holder, lure and fish hook and has for one object to provide a bait holder and lure which makes it possible to use such bait as eels or the like traveling at relatively high speed through the water without spinning or other means which would immediately betray the fact that the bait is not live.

This invention is an improvement on my United States Patent 2,196,376, issued April 9, 1940. The device there disclosed is entirely satisfactory for relatively low speed movement characteristic of fresh water. However, when that bait holder is used especially in salt water fishing at high speed, the holder and bait tend to spin or rotate about an axis generally in line with the fish line and such movement, of course, renders the bait unappetizing to fish which are intended to be caught. The present improvement over the earlier device lies first in the fact that the concave depending portion is bifurcated or slotted at the bottom and the flow of water through this bifurcation or slot prevents rotation and stabilizes the bait.

Another advantage of the improvement is that the main hook, its shank anchored at the forward end to the back side of the concave depending portion is embedded throughout a substantial part of its length in the body of the bait, the barbed hook projecting from the body of the bait so that the shank suports the bait and holds it in correct relationship with the hook.

Another advantage of the present invention is the method of attaching the stiff shank of the hook to the depending portion so that the only bending or angular displacement possible is right at the point where the shank of the hook is anchored on the plate.

In using my device, the barbed hook is inserted in the belly of the fish, the barb entering toward the rear of the fish and the hook is then rotated and forced into the fish until the desired point is reached when it is further rotated and the barb passes out through the skin of the fish so that the shank is embedded in the fish bait with the curved barbed part of the hook extending downward and forward under the belly of the bait.

Thereafter, the shank extending forwardly from the plate is inserted either through the throat of the fish or through the gill into the mouth so that the holding means or attachment to the line may be passed through both lips of the mouth and through the hole so that the mouth is held shut. Thus the bait is held by the shank, the line attachment and the curved rear end of the hook.

When two hooks are to be used, the closer or forward hook is rigidly attached to the shank of the main hook and of course the presence of the secondary hook limits the rearward movement of the main hook as it is threaded on the bait.

My invention is illustrated more or less diagrammatically in the accompanying drawings, wherein—

Like parts are indicated by like characters throughout the specification and drawings.

Figure 1:
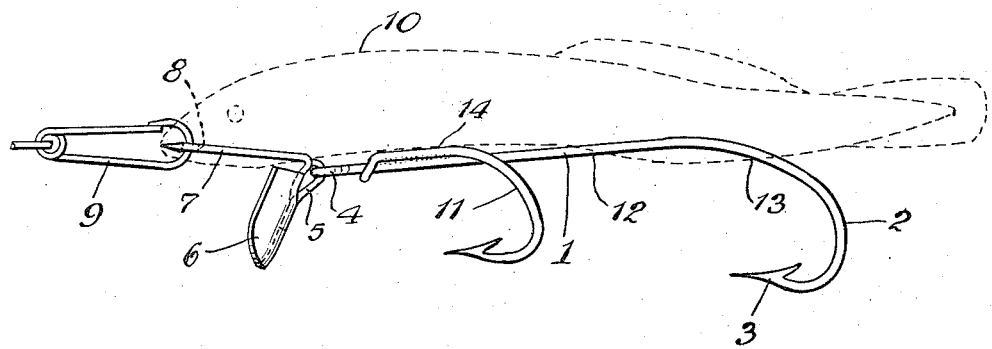
Figure 1 is a side elevation of the bait holder showing the bait in dotted line.
Figure 2:
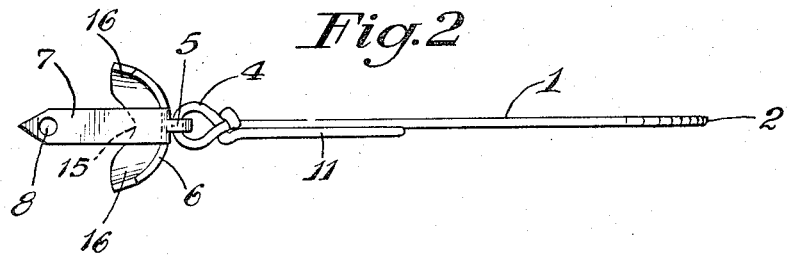
Figure 2 is a plan view of the bait holder.
Figure 3:
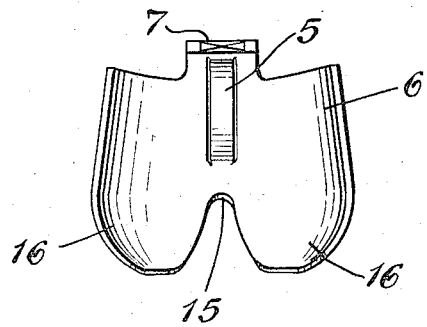
Figure 3 is a front view of the downwardly deflecting blade.

1 is the long stiff shank of the main hook. It is curved at its rearward end as at 2 in the usual manner and terminates in the pointed barb 3 at the forward end, the shank 1 terminates in an eyelet 4 which engages the stirrup 5 stamped out of the upper central portion of the concavo convex blade 6. 7 is a shank extending forwardly from the upper portion of the blade 6, pointed to penetrate the fish and apertured at 8 for attachment by means of a hook 9 which may pass through the upper and lower lips of the bait shown at 10 in dotted lines.

The auxiliary hook 11 has its shank soldered or otherwise rigidly attached to the shank 1 with its barb extending forwardly as is usual. In Figure 1, I have shown the dotted line relationship between the bait and the shank 1. In attaching the bait, the barb 3 is inserted at the point 12 and comes out of the bait at the point 13. Were the auxiliary hook 11 omitted, the barb might have been inserted say at the point 14 further forward of the bait but in either case a substantial part of the shank 1 is embedded in the fish bait and so stiffens or reinforces the bait.

The concavo convex plate 6 is notched on its lower edge as at 15. Thus the upper portion except for the aperture stamped out to take the stirrup 5 is concavo convex. The lower portion is divided up into two separate concavo convex fingers 16 which deflect some of the water inwardly, downwardly and backwardly through the aperture 15 so that a jet of water passes through the lower portion of the blade and tends to stabilize the bait holder and prevent rotation while at the same time preventing vibration of lateral movement which is desirable to simulate movement of live bait through the water.

I have shown the shank or bait impaling member 7 as a relatively flat piece. The shape is unimportant so long as it will penetrate or impale a portion of the bait.

I claim:

1. A bait holder including a forwardly extending bait impaling member adapted to be attached to a fish lure, a plate extending downwardly therefrom, having at its lower edge a relatively wide and deep notch, the longitudinal axis of said impaling member and the longitudinal axis of said plate being substantially in the same plane, and said plate comprising two inclined fingers divided by said notch.

2. A bait holder including a forwardly extending bait impaling member adapted to be attached to a fish lure, a plate extending downwardly therefrom, having at its lower edge a relatively wide and deep notch, the longitudinal axis of said impaling member and the longitudinal axis of said plate being substantially in the same plane, and said plate comprising two inclined fingers divided by said notch, a fish hook having a long stiff shank and means for attaching the forward end thereof to the back of the plate for free angular movement with respect to the impaling member.

3. A bait holder including a forwardly extending bait impaling member adapted to be attached to a fish lure, a plate extending downwardly therefrom, having at its lower edge a relatively wide and deep notch, the longitudinal axis of said impaling member and the longitudinal axis of said plate being substantially in the same plane, and said plate comprising two inclined fingers divided by said notch, a fish hook having a long stiff shank and means for attaching the forward end thereof to the back of the plate for free angular movement with respect to the impaling member, an auxiliary hook rigidly attached to the forward end of the shank and located in the same plane as and in front of the first mentioned hook.

4. A bait holder including a forwardly extending bait impaling member adapted to be attached to a fish lure, a plate extending downwardly therefrom, forwardly inclined thereto, having at its lower edge a relatively wide and deep notch, the longitudinal axis of said impaling member and the longitudinal axis of said plate being substantially in the same plane, and said plate comprising two inclined fingers divided by said notch.

5. A bait holder including a forwardly extending bait impaling member adapted to be attached to a fish lure, a plate extending downwardly therefrom, forwardly concave, having at its lower edge a relatively wide and deep notch, the longitudinal axis of said impaling member and the longitudinal axis of said plate being substantially in the same plane, and said plate comprising two inclined fingers divided by said notch.

6. A bait holder including a forwardly extending bait impaling member adapted to be attached to a fish lure, a plate extending downwardly therefrom, forwardly inclined thereto and forwardly concave, having at its lower edge a relatively wide and deep notch, the longitudinal axis of said impaling member and the longitudinal axis of said plate being substantially in the same plane, and said plate comprising two inclined fingers divided by said notch.

7. A bait holder including a forwardly extending bait impaling member adapted to be attached to a fish lure, a plate extending downwardly therefrom, having at its lower edge a relatively wide and deep notch, the longitudinal axis of said impaling member and the longitudinal axis of said plate being substantially in the same plane, and said plate comprising two inclined fingers divided by said notch, a fish hook having a long stiff shank and means for attaching the forward end thereof to the back of the plate for free angular movement with respect to the impaling member, the means comprising an integral stirrup extending rearwardly from the plate and an eyelet at the end of the shank interlocking with the stirrup.

8. A bait holder including a forwardly extending bait impaling member adapted to be attached to a fish lure, a plate extending downwardly therefrom having at its lower edge a relatively wide and deep notch, the longitudinal axis of said impaling member and the longitudinal axis of said plate being substantially in the same plane, said plate comprising two inclined fingers divided by said notch, and a hook carried by the bait holder depending below the body of the fish lure and behind the plate.

9. A bait holder including a forwardly extending bait impaling member adapted to be attached to a fish lure, a plate extending downwardly therefrom having at its lower edge a relatively wide and deep notch, the longitudinal axis of said impaling member and the longitudinal axis of said plate being substantially in the same plane, said plate comprising two inclined fingers divided by said notch, a hook carried by the bait holder depending below the body of the fish lure and behind the plate, the plate being permanently mounted on the impaling member and held thereby against movement with respect to the fish lure where the plate contacts the fish lure.

10. A bait holder including a forwardly extending bait impaling member adapted to be attached to a fish lure, a plate extending downwardly therefrom having at its lower edge a relatively wide and deep notch, the longitudinal axis of said impaling member and the longitudinal axis of said plate being substantially in the same plane, said plate comprising two inclined fingers divided by said notch, a hook carried by the bait holder depending below the body of the fish lure and behind the plate, the plate being permanently mounted on the impaling member and held thereby against movement with respect to the fish lure where the plate contacts the fish lure, the hook being free to move angularly with respect to the plate and the bait holder.

References Cited in the file of this patent

UNITED STATES PATENTS

| | | |
|---|---|---|
| 1,457,926 | Dunkelberger | June 5, 1923 |
| 1,828,574 | Neukam | Oct. 20, 1932 |
| 2,196,376 | Anderson | Apr. 9, 1940 |